Feb. 7, 1961  R. H. KIESSLING  2,970,496
ACTUATOR
Filed Feb. 13, 1959  2 Sheets-Sheet 1
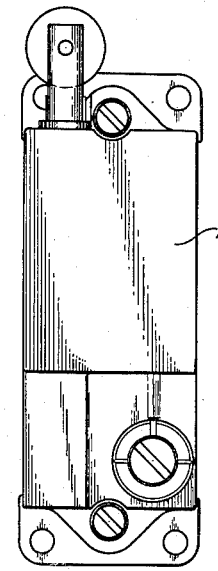
FIG. 1
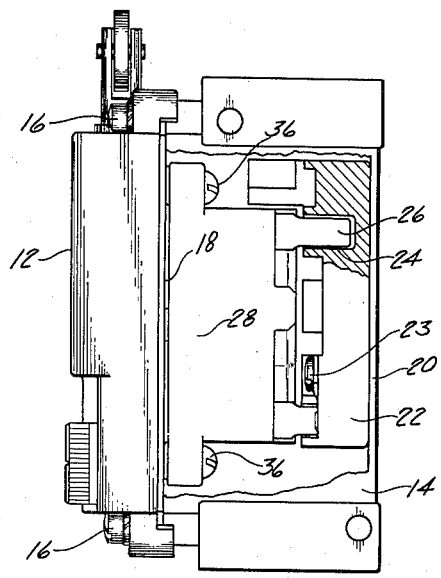
FIG. 2
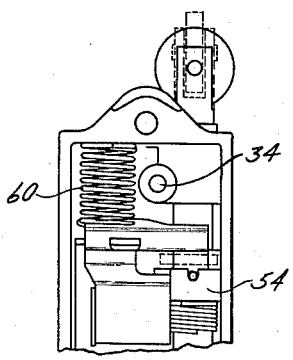
FIG. 3
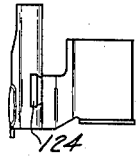
FIG. 4
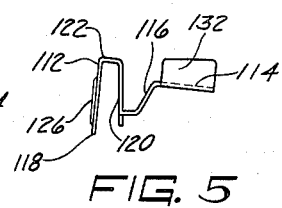
FIG. 5
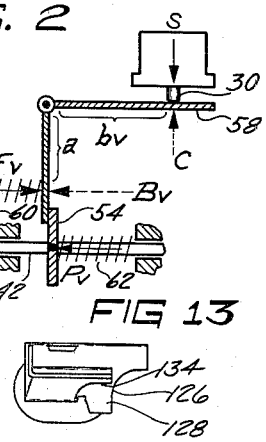
FIG 13
FIG. 6
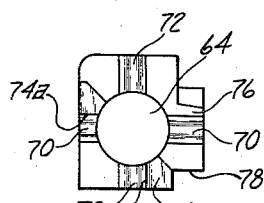
FIG. 7
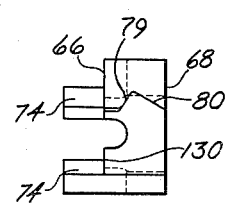
FIG. 8
INVENTOR.
RUDOLF H. KIESSLING
BY
William H. Schmelz Feb. 7, 1961 R. H. KIESSLING 2,970,496
ACTUATOR
Filed Feb. 13, 1959 2 Sheets-Sheet 2

INVENTOR.
RUDOLF H. KIESSLING
BY

United States Patent Office 2,970,496
Patented Feb. 7, 1961

2,970,496
ACTUATOR

Rudolf H. Kiessling, Milwaukee, Wis., assignor to Square D Company, Detroit, Mich., a corporation of Michigan Filed Feb. 13, 1959, Ser. No. 793,114

11 Claims. (Cl. 74—503)

This invention relates to actuating mechanisms and is more particularly concerned with actuating mechanisms for electric switches.

In modern industrial practice, devices known as limit switches are frequently employed to control the sequence of operations of a machine or process. It is to be appreciated that these limit switches to be commercially acceptable must be reliable in their operation, be capable of being readily serviced, and be adaptable to be installed in a variety of locations.

The actuating mechanism according to the present invention is particularly suited for use in connection with limit switches of the plunger operated type and includes an arrangement wherein the plunger operator for the mechanism is journalled in bores located in opposite end walls of the mechanism housing. This arrangement will provide maximum support for the plunger and minimize the bending effects of forces which are used to actuate the plunger when the forces are applied at an angle to the longitudinal axis of the plunger. Further, the actuating mechanism according to the present invention is arranged so the at-rest position of the plunger in the housing may be adjusted to suit the individual installation requirements of the limit switch. The adjustments provided include an eccentric adjustment whereby the plunger extension from the housing can be adjusted externally from the housing after the switch has been mounted and wired, and an adjustment whereby the plunger can be rotated and held for operation in either of two positions which positions are at right angles to each other. Thus, when the switch is operated with a roller cam carried by the external end of the plunger, the roller can be oriented in a position most favorable to the direction of movement of the operator which will actuate the switch. A further feature incorporated in the switch actuating mechanism according to the present invention is that the force required to move the plunger of the snap switch will remain constant regardless of the at-rest plunger extension from the housing. Thus, the operating characteristics of the snap switch will remain constant regardless of the adjustments which are made to the actuating mechanism.

It is an object of the present invention to provide a rugged reciprocal plunger type actuating mechanism wherein the plunger is carried in bores disposed on opposed ends of a housing for the mechanism.

A further object of the present invention is to provide a reciprocal plunger type actuating mechanism wherein the plunger supports a disk-like cam externally of the housing with a means which will permit the cam to be positioned in either one of two angular positions relative to the housing and more particularly, wherein the actuating cam for the mechanism may be positioned in either one of two 90° positions.

Another object of the present invention is to provide a means in a plunger operated actuating mechanism for varying the axial at-rest position of the plunger in the housing for the mechanism.

A still further object of the present invention is to provide an adjustment external to the housing of a plunger operated actuating mechanism for adjustably varying the extension of the plunger from the housing.

It is still another object of the present invention to provide a plunger operated actuating mechanism which has a cam rotatably mounted on an exposed end of the plunger with a means which will permit the plunger to be rotated and positioned in either one of two 90° positions and to vary the longitudinal extension of the plunger from the housing for the mechanism.

In carrying out the above objects it is a further object of the present invention to provide a mechanism for actuating a plunger operated switch which mechanism has an input plunger and an output lever and a means for adjusting the distance which the input plunger extends from the housing for the mechanism while the input plunger is in the de-actuated position without varying the force which the output lever exerts on the plunger of the switch when the input plunger is moved to the actuating position.

Further objects and features of the invention will be readily apparent to those skilled in the art from the specification and appended drawings illustrating certain preferred embodiments in which:

Fig. 1 is a front plan view of the actuating device according to the present invention.

Fig. 2 is a side view of the device in Fig. 1 showing a portion of the housing for the switch, which may be used with the actuating device according to the present invention, partly broken away to illustrate the arrangement whereby the switch may be used with a plug-in terminal base.

Fig. 3 is a bottom plan view of a broken away portion of the actuating mechanism according to the present invention showing the arrangement of certain parts of the actuating mechanism.

Figs. 4, 5, and 6 are top, side and end views respectively of the output lever of the actuating mechanism as shown in Fig. 3.

Figs. 7 and 8 are end and side views respectively of the member which transmits the motion of the actuating plunger to the output lever.

Figure 9:
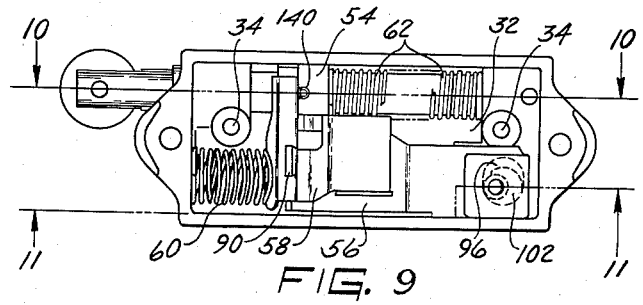

Fig. 9 is a bottom plan view of the actuating device according to the present invention.

Figure 10:
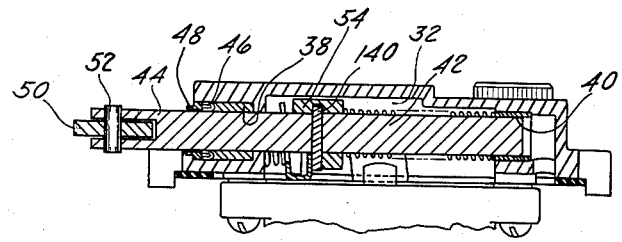

Fig. 10 is a cross sectional view taken along line 10—10 in Fig. 9.

Figure 11:
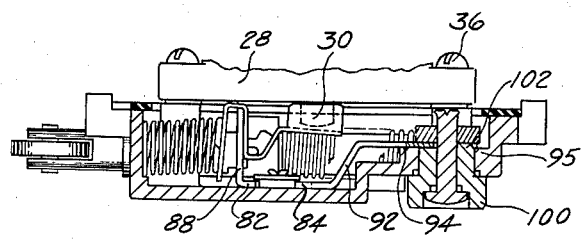

Fig. 11 is a cross sectional view taken along line 11—11 in Fig. 9, showing the device with the actuating plunger in the at-rest position.

Figure 12:
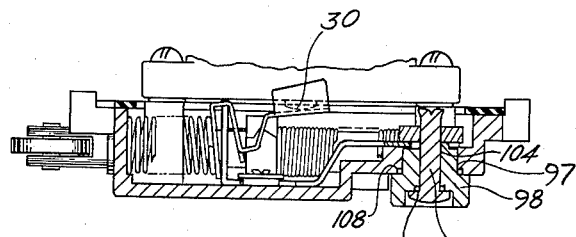

Fig. 12 is a view of the device shown in Fig. 11 with the actuating plunger as moved to the actuated position.

Fig. 13 diagrammatically illustrates the lever arrangement whereby a constant actuating force on the snap switch plunger is achieved.

In the drawings, the numeral 10 is used to designate a limit type switch incorporating the actuating mechanism according to the present invention. The limit switch 10 includes an upper housing section 12 and a lower housing section 14. Each of the sections 12 and 14 have recesses therein which cooperate to provide an internal chamber when the sections 12 and 14 are secured together by screws 16 extending through suitable openings in section 12 into tapped holes in section 14. Positioned between the sections is a suitable gasket 18 which is compressed when screws 16 are tightened to prevent entrance of dirt and moisture into the chamber defined by the sections 12 and 14.

A member 22 of insulating material is secured to the bottom wall 20 of the recess in the lower housing section 14. This member 22, which does not per se constitute one of the features of the present invention, is provided with suitable openings 24 to act as female electrical sockets which are electrically connected to suitable terminals, one of which is shown as terminal screw 23. The openings 24 act as female socket members to receive suitably located male plug-in terminals 26 which are secured to the rear surface of a snap switch 28. The snap switch 28, per se, does not constitute one of the features of the present invention other than its use in combination with the actuating mechanism to be hereinafter described and the plug-in member 22. The snap switch 28, which may be of any well known type, is provided with an actuating plunger 30, most clearly seen in Fig. 11. The plunger 30 is reciprocally movable from the position shown in Fig. 11 to the position shown in Fig. 12 to cause a switching action to occur internally within the switch 28. In this connection the plunger 30 normally is biased to the position in Fig. 11 by spring means located within the switch 28, and hence not shown. The switch 28 may be either single or double throw and single or multiple pole types.

As heretofore stated, the upper housing section 12 is provided with a recess which is designated as recess 32 and most clearly shown in Figs. 9 and 10. Suitably located at opposite ends of the recess are bosses which have tapped openings 34 therein which are threaded to receive screws 36, as in Figs. 2 and 11, to position the switch 28 on the housing section 12 prior to the assembly of sections 12 and 14. Also located in the opposite end walls of the recess 32 are bores 38 and 40, as shown in Fig. 10. The bores will slidingly journal an actuating plunger 42 which is rod-like in shape and has an end 44 extending through bore 38 external of the housing section 12. If desired, the bores 38 and 40 may be suitably sized to receive oil impregnated porous metal bearings which are well known. The bore 38 also may be provided with a U-shaped elastomeric seal 46 which is positioned between the bearing in bore 38 and a seal retainer 48. The seal 46 and bearing in bore 38 will prevent entrance of moisture into the chamber within the limit switch housing 10.

The end 44 of the plunger 42 may be provided with a rounded surface or may be slotted to receive a roller cam 50 which is rotatively mounted in the slot by means of an axle pin 52. Roller cams 50 are frequently furnished with a plunger operated type limit switch of the type herein shown to provide a rotatable connection between the actuating plunger 42 and the surface of an operator, not shown, which is moved into contact with the cam 50 to actuate the switch mechanisms. In this connection it is to be noted that the direction of actuating force applied to the roller cam 50 frequently will be at an angle to the longitudinal axis of the plunger 42. The bores 38 and 40, located at opposite ends of the recess 32, thus provide the maximum support for the plunger 42 and minimize the rotational bending effects of these forces applied to the plunger 42.

The remaining parts of the switch actuating mechanism which includes a member 54, a pivot member 56, an actuating lever 58 and a pair of springs 60 and 62 will now be described. The parts transmit the longitudinal movement of the actuating plunger 42 to the switch actuator 30 so the direction of movement of actuator 30 is normal to the movement of plunger rod 42.

The member 54, most clearly seen in Figs. 7 and 8 of the drawings, is preferably formed of shock resistant material such as nylon, to have a bore 64 extending therethrough permitting the member 54 to be slidingly positioned on the plunger rod 42 as in Fig. 9. The member 54 also has parallel front and rear faces 66 and 68 respectively. Located in the front face 66 and radiating from the bore 64 are pairs of oppositely extending grooves 70 and 72. The pairs of grooves are at right angles to each other. Extending from the front face 66 and positioned between the pairs of grooves 70 and 72 are stops 74. These stops each have a surface 74a extending outwardly from one of the edges of one of the grooves of the respective pairs of grooves 70 and 72. The surface 74a limits the movement of a pin 140 as will be later described. Extending outwardly from a side wall of member 54 is a lug 76 having a notch 78 along its bottom edge. The notch 78 will slide along a suitably located rib formed along the wall which forms the bottom wall of recess 32. The top surface of the lug 76 has raised inclined surfaces 79 and 80. The purpose of these surfaces 79 and 80 will become hereinafter apparent.

The pivot member 56 which provides a movable pivot for the actuating lever 58 is most clearly shown in Fig. 11 and has a central portion 82 which is slidable on the bottom wall of recess 32. The portion 82 has a slotted opening 84 therein which receives a screw or rivet 86 which is used to secure the pivot member 56 in the recess while permitting longitudinal movement of the member 56 in the recess 32. Extending vertically upwardly from one end of the central portion 82 is a pivot portion 88. The top edge of the pivot portion is provided with a lug 90 and the bottom edge is suitably notched to provide clearance for the plunger 42 and the rib which engages the notch 78. Extending from the other end of the central portion 82 is an inclined portion 92 connecting an adjusting portion 94 to the central portion 82. The portion 94 is arranged to slide on a raised portion 95 in the bottom wall of recess 32 and includes an oblong opening 96.

A bore 97 in the bottom wall of the recess 32 in the raised portion 95 extends to the exterior of the housing section 12. Rotatively received in bore 97 is a bearing portion of an adjustment member 98. One end of the adjustment member 98 is provided with an adjusting knob 100 which extends externally of the housing section 12 and the other end is provided with an eccentric crank portion 102 which is received in the opening 96. The adjustment member 98 has a bore 104 therein to receive a screw 106 which is threaded into a nut-like member 107 to secure the crank portion 102 in the opening 96. If desired, the bore 104 may be counterbored to receive the head of the screw 106 and sealing gaskets, such as O-rings 108 and 110, may be positioned between the adjusting portion 100 and the housing section 12 and the head of the screw 106 and the base of the counterbore. It is clearly apparent that rotation of the adjusting portion 98 will cause a corresponding rotation of the crank portion 102 which rotation will be transmitted through the opening 96 to cause the entire member 56, including the pivot portion 88, to be moved longitudinally in the recess 32. After the above adjustment is accomplished, the parts may be maintained in the adjusted position as when the screw 106 is tightened into the nut-like member 107.

The shape of the actuating lever 56 is most clearly seen in Figs. 4–6 of the drawings. The lever 56 has a U-shaped pivot portion 112 and a shelf-like portion 114 which engages the plunger 30. The portions 112 and 114 are interconnected by an inclined intermediate portion 116. The U-shaped pivot portion 112 is provided with arms 118 and 120 which are nonparallel and extend from a bight portion 122. The bight portion 122 is pivoted upon the upper edge of the pivot portion 88 of pivot member 56 and is provided with an opening 124 to receive the lug 90. The arms 118 and 120 are cut away as at 126 to provide clearance for the plunger 42 when the lever 58 is positioned on the pivot member 56. The arm 118 may be provided with a spring seat 126 and the arm 120 is provided with an extending tang portion 128 which is engaged by a portion 130 on the lug 70 which is formed on the member 54. The shelf-like switch actuating portion 114 has an upstanding flange 132. Extending downwardly from portion 114 and formed as a part of the inclined intermediate portion 114 is an edge 134. This edge is arranged to pass over the inclined surface 80 and engage or hook behind the surface 79 for the purpose which will become hereinafter apparent.

Positioned between the spring seat 126 and the front wall of the recess 32 is the coil spring 60. This spring 60 normally urges the arm 118 into engagement with the pivot portion 88. Also surrounding the rod 38 and having one end resting on the rear face 68 of member 54 and the other end resting in the rear wall of recess 32 is a coil spring 62. The coil spring 62 is selected to withstand a slightly stronger compressive force than spring 60 and therefore overpowers the force of spring 60 on lever 58 to normally urge the arm 120 into engagement with the pivot portion 88.

Properly located in the plunger 42 is a pin 140 which has its ends extending beyond the outer surface of the plunger 42 to be received in either of the pair of grooves 70 and 72, as in Fig. 3. The spring 62 reacting against the member 54 in turn constantly urges the plunger 42 to the left in Fig. 10.

With the above parts in mind, the operation of the device above described will now be explained. When the device is in the at-rest position, as shown in Fig. 11, the position of the plunger 42 will be as shown. When the plunger is actuated, i.e., when the cam roller 50 is subjected to an external force to move the plunger 42 to the right to the position shown in Fig. 12, the motion of the plunger 42 through the pin 140 will cause the member 54 also to move to the right against the force of spring 62. It is clearly apparent the movement of member 54 to the right will remove the engagement force on leg 120 of the actuating lever 58. This will permit the force of spring 60 reacting against the arm portion 118 to move the arm 118 into engagement with the pivot portion 88. The motion of arm 118 will be transmitted to the lever actuating portion 114 causing the lever actuating portion 114 to move upwardly from the position shown in Fig. 11 to the position shown in Fig. 12. This upward movement will cause the plunger actuator 30 of the snap acting switch 28 to be depressed to cause the actuation of the contacts of the switch. When the force on the plunger 42 is removed, the spring 62 will cause the parts to be moved to the at-rest position shown in Fig. 11. It is to be noted that the actuating portion 114 on the actuating lever 58 presents a rather broad surface which engages the switch plunger 30. As heretofore stated, the rotation of knob 100 will cause the position of the pivot 88 to be varied. Thus, as in Fig. 9, when the cam 102 is rotated by knob 100, the cam in the oblong opening 96 will cause the entire pivot member 56 to be moved either to the left or right. During this movement the spring 62 will cause the member 54 to follow the movement of the member 56. This movement of member 54 will be transmitted through pins 140, and cause the at-rest position of the plunger 42 to be correspondingly moved. This will vary the extension of the plunger 42 from the housing and vary the position of cam 50 relative to the housing. It is to be noted movement of the cam 50 will cause the compressive force on spring 62 to be somewhat varied while the compressive force on spring 60 is inversely varied. However, during this movement, the length of the lever arm as defined by the distance between the plunger 30 and the pivot portion 88 will likewise be varied. Thus, if the characteristics of springs 60 and 62 are properly selected, increased compressive force exerted by spring 60 will be accompanied by an increase in the effective length of the lever arm between the plunger 30 and the pivot portion 88. Therefore, if the characteristic of spring 60 is properly selected, the variation in the position of the plunger in its at-rest position relative to the housing will have a negligible effect on the force required to actuate the plunger 30 of the snap switch mechanism.

The arrangement whereby the above may be accomplished is most clearly seen in Fig. 13 of the drawings wherein like numerals are used to designate the corresponding parts described in connection with Figs. 1–12.

In Fig. 13, the term "$A_v$" represents the external input force impressed on the cam roller 50 to operate the limit switch mechanism. "$P_v$" represents the force exerted by the spring 62 on the plunger. "$F_v$" represents the force exerted by a spring 60 on the lever member 58. "S" represents the force opposing the movement of the plunger 30 of the snap switch. "$a$" represents the length of the lever arm between the fulcrum of pivot 88 and bight 122 and the point of application of spring 60 on arm 118. "$b_v$" represents the effective length of the lever arm between the fulcrum for bight 122 and the point of engagement of the lever arm 114 with the plunger 30.

With the above in mind therefore, C, which is desired to be constant, is equal to $$\frac{F_v \times a}{b_v}$$

C representing the force which is exerted by the lever means 58 on the plunger 30 of the snap switch. The term $B_v$ which is equal to $$\frac{S \times b_v}{a}$$

equals the force exerted by snap switch plunger 30 which opposes the force exerted by spring 60. With the above parts in mind it is apparent that if the switch is to function properly, the force C must be greater than the force S, the force $F_v$ must be greater than $B_v$, and the force $P_v$ must be greater than $(F_v - B_v)$ and the force D which is the force available to actuate plunger 30 as represented by $C - S = D$, can be made constant regardless of the extension of the plunger from the housing. This may be achieved by selecting the characteristics of spring 60 so $F_v$ is proportional to $b_v$. This occurs because:

$$C = \frac{F_v \times a}{b_v}$$

or $$F_v = b_v \times \frac{C}{a}$$

From the above equation, it is noted that if the adjustment is moved to the left, $b_v$ will be increased and the compressive force of the spring 60 likewise will be increased to effect the constant force which is imposed on the plunger 30.

Another adjustment which may be accomplished by the above device is illustrated in Fig. 3. It is apparent that as the plunger is depressed, the arm portion 114 will move upwardly and the edge 134 will ride over the inclined surface 80 and be in a position to engage the inclined surface 79 when the flange 132 is pressed downwardly while the plunger is in a retracted position. When the edge 134 is engaged behind the inclined surface 79, the member 54 will be held in a retracted position against the force of spring 62. When the parts are in this position, the plunger may be pulled to the left and rotated 90° to move the pin 140 from engagement in one pair of grooves, i.e., grooves 72, as in Fig. 7, to the position where it will engage the horizontal grooves, i.e., groove 70, as shown in dotted lines in Fig. 3. When the force on the flange 132 is removed, the spring 60 will cause the edges 134 to move slightly upwardly, permitting the member 54 to be urged forward to engage the arm 120 to restore parts of the actuating device to a normal position with the plunger in a new position which is 90° relative to the former position. When the parts are in this position the mechanism may be operated in the manner heretofore described.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an actuating mechanism, the combination comprising; a housing having an internal chamber with a pair of axially aligned bores at opposite ends of the chamber with one of the bores extending between the chamber and the exterior of the housing, a reciprocal actuating plunger rod slideably and rotatably mounted in the bores and having an end projecting through said one bore external to the housing, a disk rotatably mounted on said end, a member slideable on the rod within the chamber, resilient means arranged for constantly urging the member toward the disk, and means reacting between the member and rod for preventing relative rotation between rod and housing from either one of two predetermined rotative positions.

2. In an actuating mechanism, the combination comprising: a housing having an internal chamber with a pair of axially aligned bores disposed on opposite ends of the chamber with at least one of said bores extending from said chamber to the exterior of the housing, a reciprocal actuating plunger rod slideably and rotatably mounted in said bores and having an end extending externally through said one bore externally of the housing, means on said end of the rod arranged to rotatably mount a disk, a member slideable on the rod within the chamber, resilient means arranged for constantly urging the member toward said disk, and releasable stop means carried by the rod and engageable with the member arranged to prevent rotation between the rod and housing from either one of two predetermined rotative positions.

3. In an actuating mechanism, the combination comprising; a housing having an internal chamber with a pair of axially aligned bores disposed on opposed ends of the chamber with at least one of said bores extending from the chamber to the exterior of the housing, a reciprocal actuating plunger rod slideably and rotatably mounted in said bores and having an end projecting external to the housing through said one bore, means on said end for rotatively mounting a disk, a member slideably mounted on the rod within the chamber, a coil spring surrounding said rod and reacting between the housing and member for constantly urging the member toward the disk and means reacting between the rod and member for limiting the movement of the member toward said disk and preventing rotation between the rod and housing from either one of two predetermined rotative positions.

4. In an actuating mechanism, the combination comprising; a housing having an internal chamber with a pair of axially aligned bores at opposite ends of the chamber with one of the bores extending between the chamber and the exterior of the housing, a reciprocal actuating plunger rod slideably and rotatably mounted in the bores and having an end projecting through said one bore external to the housing, a disk rotatably mounted on said end, a member slideable on the rod within the chamber, resilient means arranged for constantly urging the member toward the disk, and means reacting between the member and rod for limiting the movement of the member toward the disk and for preventing relative rotation between rod and housing from either one of two predetermined rotative positions.

5. In an actuating mechanism, the combination comprising; a housing having an internal chamber with a pair of spaced axially aligned bores at opposite ends of the chamber, a reciprocal actuating plunger rod slideably and rotatably mounted in the bores and having one end thereof extending through one of the bores external to the housing, a disk rotatably carried on the said one end of the plunger, a member slideably mounted on the plunger rod, means for preventing movement between the rod and member, a pivot disposed with the chamber, and an actuating lever pivotally mounted on the pivot and actuable by the member and means for adjustably positioning the position of the pivot from a point external to the housing.

6. In an actuating mechanism for a switch, the combination comprising; a housing having an internal chamber with a pair of axially aligned bores disposed on opposed ends of the chamber, a reciprocal actuating plunger rod slideably and rotatably mounted in the bores and having an end extending through one of the bores external to the housing, said end having a disk rotatably mounted thereon, means within said chamber for holding said rod against rotation from either one of two predetermined angular positions relative to the housing, and means accessible from the exterior of the housing for adjustably positioning the rod longitudinally in the housing.

7. In an actuating mechanism for a switch, the combination comprising; a housing having an internal chamber with a pair of axially aligned bores disposed on opposed ends of the chamber, a reciprocal actuating plunger rod slideably and rotatably mounted in the bores and having an end extending through one of the bores external to the housing, said end having a disk rotatably mounted thereon, means within said chamber for holding said rod against rotation from either one of two predetermined angular positions relative to the housing, a member slideable on the rod, and means accessible from the exterior of the housing for adjustably positioning the rod longitudinally in the housing, both of said last mentioned means being operative through the member slideably carried by the rod.

8. In an actuator for a switch having a spring biased reciprocal plunger, the combination comprising; a housing having an internal chamber, a reciprocal actuator plunger rod having a portion extending exterior to the housing and a portion movable in the chamber from an at rest position, a disk rotatably mounted on the extending portion of the rod, means within the chamber for actuating the plunger of the switch in response to reciprocal movement of the plunger rod from the at rest position, means within the chamber for normally preventing rotation of the rod in the housing and permitting the rod to be adjustably positioned in more than one angular position relative to the housing, and means in said chamber having a portion accessible externally of the housing for adjustably positioning the longitudinal at rest position of the rod in the housing.

9. In an actuator for a switch having a spring biased reciprocal plunger, the combination comprising; a housing having an internal chamber, a reciprocal actuator plunger rod having a portion extending exterior to the housing and a portion movable in the chamber from an at rest position, a disk rotatably mounted on the extending portion of the rod, a spring biased means within the chamber for actuating the plunger of the switch in response to reciprocal movement of the plunger rod from the at rest position, means within the chamber for normally preventing rotation of the rod in the housing and permitting the rod to be adjustably positioned in more than one angular position in the housing, and means in said chamber having a portion accessible externally of the housing for adjustably longitudinally positioning the at rest position of the rod in the housing, said spring biased means and said means for longitudinally positioning the plunger being arranged so the force on the snap switch plunger remains constant independently of the adjusted longitudinal position of the plunger.

10. In an actuator, the combination comprising; a housing having a chamber therein with a pair of axially spaced bores disposed on opposed ends of the chamber, a reciprocal rod journalled in the bores and having one end extending external to the housing, a disk rotatably mounted on the rod on an axis at right angles to the longitudinal axis of the rod, a member of generally rectangular shape having; a bore therein to slideably receive said rod within the chamber, said member having a pair of adjacent first and second side walls engaging the housing, a front face and a rear face with the rear face remote from said disk, a pair of radial grooves in the front face extending radially from the bore in the member, a second pair of radial grooves in the front face of the member extending at right angles to the first pair of grooves, a pair of stop lugs located on said front face between said grooves, and a third sidewall having an inclined lug thereon, a pin means carried by the rod disposed between the front face of the member and the disk and adapted to engage the stop lugs and be received in either one of the pair of grooves whereby the disk may be positioned in either one of two 90° positions relative to the housing, a first coil spring surrounding the rod and reacting between the housing and rear face for constantly urging the member toward the disk and the pin means into said grooves, a pivot member having; a pivot portion on one end, an opening adjacent the other end and a portion intermediate the opening and pivot portion secured to the housing, an actuator having a portion embracing the pivot and a portion extending from the embracing portion arranged to actuate a plunger of a snap switch, said embracing portion being engageable by the front face of said member for moving the actuating portion, a second spring disposed between the housing and embracing portion arranged to normally urge the actuating portion to a snap switch actuating position, said member being biased by the first spring engaging its rear surface to normally urge the actuating portion to a switch de-actuating position, a lug means on the actuating portion arranged to engage the inclined lug on the member for maintaining the member in a retracted position against the first spring whereby the position of the disk may be changed between the 90° positions, and eccentric means having a portion accessible exterior to the housing and a portion in the opening in the pivot member for moving the pivot portion in said chamber for longitudinally positioning the extension of the plunger from the housing, said actuating portion and second spring being arranged so the operating force on the plunger of the snap switch is constant when the extension of the plunger from the housing is adjusted.

11. In an actuating mechanism, the combination comprising; a housing having an internal chamber with a pair of axially aligned bores disposed in said housing at opposed ends of the chamber, an actuating plunger rod reciprocally movable and slideable in the bores, said rod having an end extending through one of the bores external to the housing, a disk member rotatably mounted on said end, a pivot member disposed within the chamber and having an upstanding flange providing a pivot on one end and an opening at the other end, a member movable on the rod, a spring surrounding the rod and having opposed ends seating against the member and housing for constantly urging the member toward the disk member, means carried by the rod for limiting the movement of the member toward the disk by the spring and cooperable with the member to permit relative rotation between the rod and member whereby the rod and disk may be relatively positioned in either one of two angular positions, an actuating lever disposed within the chamber, said lever having a portion embracing the pivot portion engageable with the member and an actuating portion engageable with the member for maintaining the member in a retracted position against the force of said spring when the actuating portion is manually moved to a predetermined position in the chamber whereby the member and rod may be relatively moved to permit the angular position of the rod and member to be changed, and a spring means reacting between the housing and the embracing portion of the actuating lever for constantly urging the actuating portion from said predetermined position and eccentric means carried by the housing and accessible from the exterior of the housing and cooperable with the opening in the pivot member for moving the pivot in said chamber whereby the longitudinal position of the rod in said bores may be varied for adjustably positioning the disk relative to the housing.

References Cited in the file of this patent

UNITED STATES PATENTS

| | | |
|---|---|---|
| 2,052,573 | Kesling | Sept. 1, 1936 |
| 2,073,108 | Kesling | Mar. 9, 1937 |